United States Patent Office

3,189,618
Patented June 15, 1965

3,189,618
THIOPHTHENES
Wallace R. Brasen, Lynnfield, Wilmington, Del., assignor to E. I. du Pont de Nemours and Company, Wilmington, Del., a corporation of Delaware
No Drawing. Filed Aug. 31, 1961, Ser. No. 135,116
12 Claims. (Cl. 260—329)

This invention relates to a new class of heterocyclic organic compounds containing fused thiophene rings, and to a method for preparing them.

Polycyclic compounds with fused-ring structures are used widely as dyes or pigments, or as intermediates in the synthesis of dyes and pigments. Such compounds containing one or more amino groups as substituents are especially useful, because of the many synthetic reactions into which the amino groups can enter. These reactions include condensation with carbonyl compounds, diazotization followed by replacement of the diazonium group, dehydrogenation to give azo linkages, and cyclization to give additional fused heterocyclic rings containing nitrogen atoms. Only a few monoamino derivatives of compounds containing two fused thiophene rings have been made, and the methods involve many steps and give low overall yields. No diamino derivatives of such polycyclic compounds are known.

It has now been found that certain substituted diaminothieno(3,2-b)thiophenes and diaminothiophthenes can be easily prepared in good yield by the self-condensation of readily available dicyanoethylene bis(substituted-methyl sulfides) in the presence of a base. Specifically, a 3,6-diamino-2,5-disubstituted-thieno(3,2-b)thiophene (I) is prepared by bringing a 1,2-dicyanoethylene bis(substituted-methyl sulfide) into contact with a base:

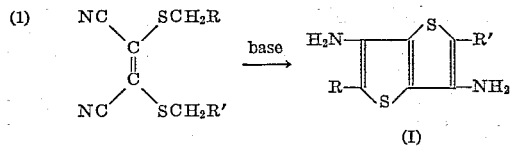

and a 3,4-diamino-2,5-disubstituted-thiophthene (II) is prepared by bringing a 1,1-dicyanoethylene bis(substituted-methyl sulfide) into contact with a base:

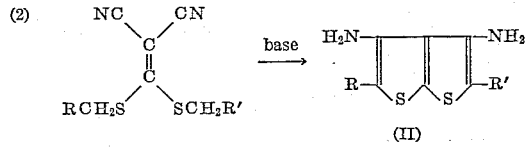

In the process and products of the invention, R and R' are electron withdrawing groups, including —CN, —NO$_2$, perfluoroalkyl of up to 12 carbons,

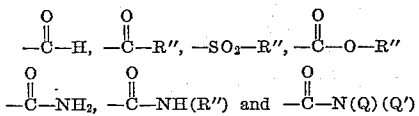

wherein R'' is hydrocarbyl of up to 12 carbons, and Q and Q' may be the same or different and are hydrocarbyl, the total number of carbons in Q plus Q' being up to 12. Preferably, R and R' are

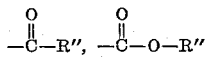

or —CN, wherein R'' is as defined above, particularly those in which R plus R' have a total of up to 14 carbons.

Any base having a pK$_b$ value of less than about 7.5 may be used in the process of the invention. The symbol pK$_b$ designates the negative logarithm of the basic dissociation constant (K$_b$). Thus, the stronger the base, the lower the value of pK$_b$. (For a brief discussion of pK$_b$, see Organic Chemistry, Fieser and Fieser, 3rd ed. (1956), p. 226.) Naturally the stronger bases drive the reaction to completion more rapidly, and therefore, bases having a pK$_b$ value of less than about 5.5 are preferred, particularly the alkali-metal hydroxides, alkaline earth metal hydroxides and quaternary ammonium hydroxides which have a pK$_b$ of about −1.7. Examples of bases having a pK$_b$ less than about 5.5 are ammonia; primary, secondary and tertiary alkyl- and cycloalkylamines (e.g., n-butylamine, cyclohexylamine, dimethylamine, and triethylamine); secondary or tertiary heterocyclic amines (e.g., piperidine and N-methylpyrrolidine); quaternary ammonium hydroxides (e.g., benzyltrimethylammonium hydroxide); and alkali metal and alkaline earth metal hydroxides (e.g., sodium hydroxide or barium hydroxide). Bases having a pK$_b$ between about 5.5 and 7.5 include, e.g., triethanolamine (6.23), diethyl-p-toluidine (6.91) and diethylaniline (7.44).

The molar ratio of base to dicyano compound should be at least 0.01:1.0 and preferably is in the range of 0.5:1.0 to 4.0:1.0. Amounts in excess of 4.0:1.0 can be used but offer no advantage.

Although it is not essential, the process is preferably carried out in an inert solvent for the compound to be cyclized and the base. Examples of such mutual solvents are alcohols, such as ethyl alcohol; glycols, such as 1,2-dihydroxypropane; partly or completely etherified glycols, such as 1-methoxy-2-hydroxyethane and 1,2-dimethoxyethane; other acyclic or cylic ethers, such as ethyl ether, tetrahydrofuran, and 1,4-dioxane; sulfoxy compounds, such as dimethyl sulfoxide and tetramethylene sulfone; and nitriles such as acetonitrile and propionitrile.

The temperature and pressure at which the process is carried out are not critical, and therefore, ordinary temperature and ambient pressure are conveniently employed. Higher or lower temperatures and pressures can be used but in general provide no advantage.

The time required varies considerably depending upon the reactant, the solvent, and the base. The reaction may be complete within a minute or two or may require as long as 24 hours. The products of the invention are less soluble in the reaction medium than the starting materials, and therefore usually precipitate as they are formed. When precipitation ceases, the reaction is complete. The products are crystalline solids and can be isolated by conventional techniques, e.g., by filtration or centrifugation followed by recrystallization.

The dicyanoethylene bis(substituted-methyl sulfides) used as starting materials are readily prepared by the reaction of a dicyanoethylene dimercaptide with the appropriate organic halide or halides. For examples, see Bahr and Schleitzer, Ber., 90, 442 (1957); Van Schoor et al., German 1,060,655 (Merck, A.G., 1959); and Edwards and Kendall, U.S. 2,533,233. Sodium 1,2-dicyanoethylene dimercaptide is made by the method of Bahr and Schleitzer (above). The preparation, but not the isolation, of the isomeric sodium 1,1-dicyanoethylene dimercaptide is described in U.S. 2,533,233. The same sodium salt is more conveniently prepared, and isolated, by the procedure of Hatchard, U.S. Patent 3,155,678, issued November 3, 1964.

Thus, 1,2-dicyanoethylene bis(substituted-methyl sulfides) and in which R and R' are the same are prepared by reacting two equivalents of organic halide ($RCH_2X$, wherein X is halogen) with 1,2-dicyanoethylene dimercaptide. Sulfides in which R and R' are different can be prepared by reacting a 1,2-dicyanoethylene dimercaptide with one equivalent of an organic halide ($RCH_2X$, where X is halogen) and reacting the 1,2-dicyanoethylene mono(substituted-methyl) sulfide mercaptide thus obtained with one equivalent of a second organic halide ($R'CH_2X$, where X is halogen). It is not necessary to isolate the intermediate mono(substituted-methyl) sulfide mercaptide. This procedure is described for an alkyl halide and an acyl halide in Krespan, U.S. Patent 3,140,295, issued July 7, 1964. For example, the first 1,2-dicyanoethylene bis (substituted-methyl sulfide) in the first column of Table I, infra, can be made by reacting sodium 1,2-dicyanoethylene dimercaptide with one equivalent of chloroacetamide, $ClCH_2CONH_2$, and reacting the product with one equivalent of phenyl chloroacetate, $ClCH_2COOC_6H_5$. The order in which the two organic halides are used is immaterial; in the example just described, the preparation could be conducted just as well by reacting the 1,2-dicyanoethylene dimercaptide first with phenyl chloroacetate and then with chloroacetamide.

If desired, the dicyanoethylene bis(substituted-methyl sulfide) can be prepared and used directly without being isolated from the reaction mixture as illustrated by Examples 2–5, infra.

The products of the invention also include the compounds of Formulas I and II, supra, in which one or both of certain R and R' groups have been hydrolyzed to the carboxyl group (—COOH). Thus, all products of the invention are of one of the formulas:

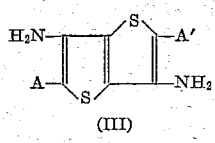

(III)

and

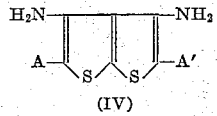

(IV)

wherein A and A', which may be the same or different, are R, R' or the carboxyl group, R and R' being as heretofore defined. Preferably, A and A' are selected from the preferred R and R' groups.

Of the above-defined R and R' groups, those which may be converted to the carboxyl group by conventional hydrolysis processes are —CN, —COOR", —CONH_2, —CONH(R"), and —CON(Q)(Q'). [See Synthetic Organic Chemistry, Wagner and Zook (1953), John Wiley and Sons, pp. 411–417.] As will be apparent to those skilled in the chemical arts, when a compound bears two (or more) hydrolyzable groups, e.g., when both R and R' in Formulas I or II are hydrolyzable groups, either one or both of such groups can be converted to —COOH by proper choice of process conditions. Of course, when only one such group is present, it may be readily converted to the carboxyl group without altering the other R substituent, i.e., —NO_2, —CHO, —COR", —SO_2R" or perfluoroalkyl.

The products of this invention are well-defined crystalline solids that are stable to air and water. They are soluble in solvents such as dimethylformamide and acetonitrile and insoluble in water, ethyl alcohol, and benzene.

They can be recrystallized from liquids such as dimethylformamide. They can be reacted with aromatic aldehydes to give colored materials useful as dyestuffs.

The following examples, in which all parts are by weight and which were all conducted at atmospheric pressure, illustrate the process and products of this invention.

EXAMPLE 1

3,6-diamino-2,5-dibenzoylthieno(3,2-b)thiophene

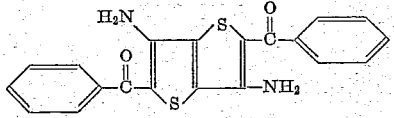

A solution of 3.8 parts of 1,2-dicyanoethylene bis-(benboylmethyl sulfide) and 19.5 parts of acetonitrile was treated with one part of triethylamine ($pK_b$ 3.25). The resulting solution, after standing overnight, had deposited yellow needles. Separation of the crystals by filtration and recrystallization from dimethylformamide yielded 3.0 parts (80%) of 3,6-diamino-2,5-dibenzoylthieno(3,2-b)-thiophene, M.P. 284–286° C.

Analysis.—Calcd. for $C_{20}H_{14}O_2N_2S_2$: S, 16.95. Found: S, 16.85.

The infrared spectrum was consistent with the above structure.

When sodium hydroxide (0.5 part) was substituted for the triethylamine, the reaction occurred within five minutes.

EXAMPLE 2

3,4-diamino-2,5-dibenzoylthiophthene

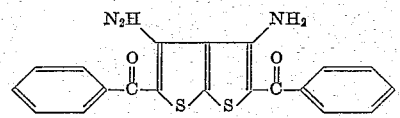

A solution of 20 parts of phenacyl bromide in 40 parts of ethanol was added to a solution of 9.3 parts of the disodium salt of dicyano-1,1-ethylenedithiol in 40 parts of ethanol. The resulting solution was boiled under reflux for one-half hour, during which time sodium bromide precipitated. The addition of 11 parts of triethylamine to the hot solution resulted in precipitation of bright-yellow, crystalline 3,4-diamino-2,5-dibenzoylthiophthene. Recrystallization of this solid from dimethylformamide yielded 8 parts (42%) of yellow plates, M.P. >300° C.

Analysis.—Calcd. for $C_{20}H_{14}N_2S_2O_2$: C, 63.48; H, 3.72; N, 7.40; S, 16.95. Found: C, 63.64; H, 3.83; N, 8.03; S, 16.86.

The infrared spectrum of this product was compatible with the above structure.

EXAMPLE 3

3,4-diamino-2,5-dibenzoylthiophthene

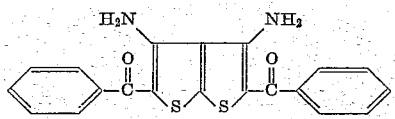

A solution of 6.6 parts of malononitrile and 7.6 parts of carbon disulfide in 40 parts of ethanol was combined with 20.2 parts of triethylamine with cooling. The resulting viscous yellow solution of the bistriethylammonium salt of dicyano-1,1-ethylenedithiol was added to a solution of 40 parts of phenacyl bromide in 79 parts of ethanol. The solution was boiled under reflux for one-half hour and cooled. The resulting solution of 1,1-dicyanoethylene bis(benzoylmethyl sulfide) was combined with 32 parts of triethylamine. The yellow precipitate which formed was recrystallized from dimethylformamide to yield 26.5 parts (70%) of 3,4-diamino-2,5-dibenzoyl-thiophthene.

Although triethylamine was used both in the preparation of the dicyano compound and the thiophene product, it is not essential that the same base be used in each instance when the dicyano compound is reacted in situ, i.e., without previous isolation from its reaction mixture.

EXAMPLE 4

*3,4-diamino-2,5-dicyanothiophthene*

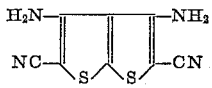

Example 3 was repeated, except that 16.5 parts of chloroacetonitrile was used in place of phenacyl bromide, to give 1,1-dicyanoethylene bis(cyanomethyl sulfide) as an intermediate. The yield of 3,4-diamino-2,5-dicyanothiophthene was 13.5 parts (61% of theory), M.P. >300° C.

*Analysis.*—Calcd. for $C_8H_4N_4S_2$: C, 43.61; H, 1.83; N, 25.44; S, 29.11. Found: C, 44.54; H, 2.23; N, 25.07; S, 28.77.

The infrared spectrum of this product was compatible with the above structure.

Example 3 was repeated, except that 33.4 parts of ethyl bromoacetate was used in place of 40 parts of phenacyl bromide, to give 1,1-dicyanoethylene bis(carbethoxymethyl sulfide) as an intermediate. The yield of 3,4-diamino-2,5-dicarbethoxythiophthene was 56.5 parts (90% of theory), M.P. 202° C.

*Analysis.*—Calcd. for $C_{12}H_{14}O_4N_2S_2$: S, 20.33. Found: S, 20.57.

The infrared spectrum of this product was compatible with the above structure.

When the 3,4-diamino-2,5-dicyanothiophthene of Example 4 or 3,4-diamino-2,5-dicarbethoxythiophthene of Example 5 is hydrolyzed, 3,4-diamino-2,5-dicarboxythiophthene as well as some 3,4-diamino-2-cyano-5-carboxythiophthene and 3,4-diamino-2-carbethoxy-5-carboxythiophthene, respectively, will be produced.

The products and processes of this invention have been illustrated by the specific Examples 1–5. However, the invention is generic to the 3,6-diamino-2,5-disubstituted-thieno(3,2-b)thiophenes and the 3,4-diamino-2,5-disubstituted-thiophthenes of Formulas III and IV. Additional specific examples of 3,6-diamino-2,5-disubstituted-thieno(3,2-b)thiophenes, the 1,2-dicyanoethylene bis(substituted-methyl sulfides) from which they can be formed by the process of this invention, and bases which bring about the reactions are listed in Table I.

TABLE I

| 1,2-dicyanoethylene bis-(substituted-methyl sulfide) $RCH_2S\ \ \ \ SCH_2R'$ $\hspace{1.2em}\diagdown C=C\diagup$ $NC\hspace{2em}CN$ | | Base (pK_b) | 3,6-diamino-2,5-disubstituted-thieno(3,2-b)thiophene | |
|---|---|---|---|---|
| R | R' | | R | R' |
| $H_2NCO$ | $COO-\langle\rangle$ | Diisopropylamine (2.95) | $H_2NCO$ | $COO-\langle\rangle$ |
| $CH_3CO$ | $COCH_3$ | Ammonia (4.74) | $CH_3CO$ | $COCH_3$ |
| $n-C_{12}H_{25}CO$ | $CN$ | 1-(n-butyl)-piperidine (3.52). | $n-C_{12}H_{25}CO$ | $CN$ |
| $CH_3-\langle\rangle-SO_2$ | $SO_2-\langle\rangle-CH_3$ | Benzyltrimethylammonium hydroxide (ca., 1.7). | $CH_3-\langle\rangle-SO_2$ | $SO_2-\langle\rangle-CH_3$ |
| cyclopentyl-CHOCO | $COOCH$(cyclopentyl)$CH_3$ | Trimethylamine (4.28) | cyclopentyl-CHOCO | $COOCH$(cyclopentyl)$CH_2$ |
| $n-C_8H_{17}OCO$ | $COOCH_2CH=CH_2$ | Barium hydroxide (ca., 1.7). | $n-C_8H_{17}OCO$ | $COOCH_2CH=CH_2$ |
| $CN$ | $CN$ | Potassium hydroxide (ca., 1.7). | $CN$ | $CN$ |
| $(CH_3)_2NCO$ | $CON(CH_3)_2$ | Sodium hydroxide (ca., 1.7). | $(CH_3)_2NCO$ | $CON(CH_3)_2$ |
| naphthyl-NHCO | $CN$ | Tetraethylammonium hydroxide (ca., 1.7). | naphthyl-NHCO | $CN$ |
| $CH_3C{\equiv}CCO$ | $COOCH(C_2H_5)_2$ | Tetraethylammonium hydroxide (ca., 1.7). | $CH_3C{\equiv}CCO$ | $COOCH(C_2H_5)_2$ |
| $(C_2F_5)(CF_3)CF$ | $SO_2CH_3$ | Hydrazine (5.52) | $(C_2F_5)(CF_3)CF$ | $SO_2CH_3$ |

EXAMPLE 5

*3,4-diamino-2,5-dicarbethoxythiophthene*

Similarly, additional specific examples of 3,4-diamino-2,5-disubstituted-thiophthenes, the 1,1-dicyanoethylene bis(substituted-methyl sulfides) from which they can be prepared, and bases which bring about the reactions are listed in Table II.

TABLE II

| 1,1-dicyanoethylene bis-(substituted-methyl sulfide) $\begin{array}{c}RCH_2S\\ \phantom{RCH_2S}\diagdown\\ \phantom{RCH_2S}\phantom{\diagdown}C=C(CN)_2\\ \phantom{RCH_2S}\diagup\\ R'CH_2S\end{array}$ | | Base (pK$_b$) | 3,4-diamino-2,5-disubstituted-thiophthene $\begin{array}{c}H_2N\phantom{xx}NH_2\\ \phantom{x}\diagdown\phantom{x}\diagup\\ R\phantom{xx}S\phantom{x}S\phantom{xx}R'\end{array}$ | |
|---|---|---|---|---|
| R | R' | | R | R' |
| CH$_2$=CH(CH$_2$)$_8$CO | CH$_2$=CH(CH$_2$)$_8$CO | Ammonia (4.74) | CH$_2$=CH(CH$_2$)$_8$CO | CO(CH$_2$)$_8$CH=CH$_2$ |
| n-C$_3$H$_7$CO | NC | n-Pentylamine (3.36) | n-C$_3$H$_7$CO | CN |
| ⟨phenyl⟩-SO$_2$ | F$_3$C | Pyrrolidine (2.89) | ⟨phenyl⟩-SO$_2$ | CF$_3$ |
| (CH$_3$)$_2$CHOCO | NC | Strontium hydroxide (ca., 1.7) | (CH$_3$)$_2$CHOCO | CN |
| n-C$_4$H$_9$OCO | n-C$_4$H$_9$OCO | Cyclohexylamine (3.36) | n-C$_4$H$_9$OCO | COO—n-C$_4$H$_9$ |
| ⟨phenyl⟩-NHCO | CH$_3$OOC | Triethylamine (3.25) | ⟨phenyl⟩-NHCO | COOCH$_3$ |
| n-C$_{10}$H$_{21}$NHCO | n-C$_{10}$H$_{21}$NHCO | Sodium hydroxide (ca., 1.7) | n-C$_{10}$H$_{21}$NHCO | CONH—n-C$_{10}$H$_{21}$ |
| NO$_2$ | O$_2$N | 2-phenylethylamine (4.17) | NO$_2$ | NO$_2$ |
| H$_2$NCO | C$_2$H$_5$OC | Tri-n-propylamine (3.30) | H$_2$NCO | COC$_2$H$_5$ |
| C$_2$H$_5$OCO | OHC | 1-methylpyrollidine (3.82) | C$_2$H$_5$OCO | CHO |
| n-C$_{12}$H$_{25}$NHCO | n-C$_{12}$H$_{25}$NHCO | Potassium hydroxide (ca., 1.7) | n-C$_{12}$H$_{25}$NHCO | CONH—n-C$_{12}$H$_{25}$ |
| CH$_2$=C=CHCH$_2$CH$_2$CO | n-C$_5$H$_{11}$OCO | Ammonium hydroxide (ca., 1.7) | CH$_2$=C=CHCH$_2$CH$_2$CO | n-C$_5$H$_{11}$OCO |
| n-C$_8$F$_{17}$ | O$_2$N | 2-phenylethylamine (4.17) | n-C$_8$F$_{17}$ | O$_2$N |
| NC | n-C$_{12}$H$_{25}$OCO | Sodium hydroxide (ca., 1.7) | NC | OCO—n-C$_{12}$H$_{25}$ |

The products of this invention are useful as intermediates in the preparation of dyes for textiles. For example, 3,4-diamino-2,5-dicarbethoxythiophthene (Example 5) can be reacted with benzaldehyde to give a bright-yellow dye. A mixture of 3 parts of the thiophene derivative and 10 parts of benzaldehyde was boiled until solution was complete (about 10 minutes), and then for 10 minutes more to insure complete reaction. Cooling brought about precipitation of a solid, bright-yellow product. Two parts of the product were dissolved in 10 parts of dimethylformamide, and the solution was poured into a vigorously stirred solution of 2 parts of sulfonated lignin ("Marasperse CB") in 2,000 parts of water. Swatches of polyamide, polyacrylonitrile, polyester, silk, wool, and cellulose acetate fabrics were immersed in this dye bath, and the bath was heated on a steam bath for one hour. After removal, washing with mild soap, and drying, the swatches were dyed light yellow, the exact shade depending on the dye and the fabric.

In addition to their use as intermediates to dyes, some of the products of this invention are dyes themselves. For example, 3,6 - diamino - 2,5 - dibenzoylthieno(3,2 - b) - thiophene (Example 1) was used to dye the fabrics mentioned above various shades of yellow by the method just described.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of a formula selected from the group consisting of:

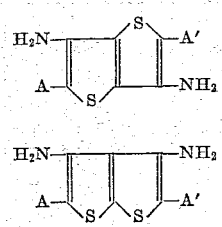

wherein each of A and A' is selected from the group consisting of —CN, —NO$_2$, perfluoroalkyl of up to 12 carbons, —CHO, —COR'', —SO$_2$R'', —COOR'', —CONH$_2$, —CONH(R''), —CON(Q)(Q') and —COOH, R'' being hydrocarbyl of up to 12 carbons, and Q and Q' being hydrocarbyl together totalling up to 12 carbons.

2. 3,6-diamino-2,5-dibenzoylthieno(3,2-b)thiophene.
3. 3,4-diamino-2,5-dibenzoylthiophthene.
4. 3,4-diamino-2,5-dicyanothiophthene.
5. The process of preparing 3,6-diamino-2,5-disubstituted-thieno(3,2-b)thiophenes and 3,4-diamino-2,5-disubstituted-thiophthenes which comprises self-condensing a dicyano compound of a formula selected from the group consisting of:

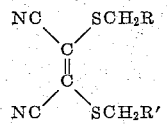

and

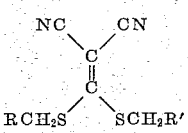

wherein each of R and R' is selected from the group consisting of —CN, —NO$_2$, perfluoroalkyl of up to 12 carbons, —CHO, —COR'', —SO$_2$R'', —COOR'', —CONH$_2$, —CONH(R'') and CON(Q)(Q'), R'' being hydrocarbyl of up to 12 carbons, and Q and Q' being hydrocarbyl together totalling up to 12 carbons, in the presence of a base having a pK$_b$ of less than about 7.5, the molar ratio of said base to said dicyano compound being in the range of 0.01:1.0 to 4.0:1.0.

6. The process of claim 5 wherein said molar ratio is in the range of 0.5:1.0 to 4.0:1.0.

7. The process of claim 5 wherein the self-condensation is carried out in the presence of an inert solvent for said dicyano compound and said base.

8. The process of claim 5 wherein said dicyano compound is 1,2-dicyanoethylene bis(benzoylmethyl sulfide).

9. The process of claim 5 wherein said dicyano compound is 1,1-dicyanoethylene bis(benzoylmethyl sulfide).

10. The process of claim 5 wherein said dicyano compound is 1,1-dicyanoethylene bis(cyanomethyl sulfide).

11. The process of claim 5 wherein said dicyano compound is 1,1-dicyanoethylene bis(carbethoxymethyl sulfide).

12. 3,4-diamino-2,5-dicarbethoxythiophthene.

References Cited by the Examiner

Degering: An Outline of Organic Chemistry, Barnes and Noble Inc., New York (1951), pages 135–6.

Gompper et al.: Angew. Chemie (Internat. Ed.), vol. 1 (1962), page 216.

Hartough et al.: Condensed Thiophenes, Interscience Publishers, Inc., New York, N.Y., 1954, pp. 372–381.

IRVING MARCUS, *Primary Examiner.*

WALTER A. MODANCE, *Examiner.*